United States Patent [19]

Morita

[11] Patent Number: 4,694,217
[45] Date of Patent: Sep. 15, 1987

[54] CATHODE RAY TUBE INCLUDING WHITE LUMINOUS PHOSPHOR SCREEN

[75] Inventor: Yasukazu Morita, Mobara, Japan

[73] Assignee: Hitachi, Ltd., Tokyo, Japan

[21] Appl. No.: 789,777

[22] Filed: Oct. 21, 1985

[30] Foreign Application Priority Data

Oct. 26, 1984 [JP] Japan ................................. 59-223903

[51] Int. Cl.$^4$ ........................ H01J 29/70; C09K 1/14
[52] U.S. Cl. ............................... 313/468; 252/301.65; 252/301.6 P
[58] Field of Search ...................... 313/467, 468, 487; 252/301.4 S, 301.4 P, 301.6 R, 301.6 S, 301.6 P, 301.4 F, 301.6 F

[56] References Cited

U.S. PATENT DOCUMENTS 3,868,533  2/1975  Schuil ................................. 313/468
4,512,912  4/1985  Matsuda et al. ............... 313/468 X

FOREIGN PATENT DOCUMENTS 13651   1/1982  Japan ................................. 313/468
716084  2/1980  U.S.S.R. ........................... 313/468

Primary Examiner—David K. Moore
Assistant Examiner—K. Wieder
Attorney, Agent, or Firm—Antonelli, Terry & Wands

[57] ABSTRACT

Disclosed is a cathode ray tube including a white emitting phosphor screen comprising, in mixing, a blue emitting phosphor having the composition expressed by a composition formula $(M_{1-x}Tb_x)_2O_2S$ (wherein M is Y and/or Gd, and the range of x is $0 < x \leq 0.01$) and at least one other phosphor which does not contain Cd. This cathode ray tube has less luminance deterioration and burning of the phosphor screen, and it causes no pollution.

20 Claims, 3 Drawing Figures

CATHODE RAY TUBE INCLUDING WHITE LUMINOUS PHOSPHOR SCREEN

BACKGROUND OF THE INVENTION

The present invention relates to a cathode ray tube, particularly to an improvement of the white emitting phosphor screen suitable for the monochrome chathode ray tube for terminal display.

Usually, heretofore, for the phosphor screen of white emitting monochrome cathode ray tubes, for instance, a phosphor of the P4 system registered in JEDEC (Joint Electron Device Engineering Councils) is used. As the P4 system phosphor of that case, a phosphor of the ZnCdS system or ZnS system, as single composition, and a mixed phosphor of the ZnCdS system and the ZnS system or of ZnS systems, as mixed system, are mainly used.

However, in the recent cathode ray tubes for terminal display, it has become inevitable to used them with high input and high current density due to the requirement for high resolution and high definition. In such case, there has been caused a problem that long time operation of a cathode ray tube using the above ZnS system phosphor as a blue phosphor increases deterioration of phosphor luminance and burning, and this is not desirable for practical use. Further, CdS system phosphors have such problem to an extent less than ZnS phosphors, but, since it is a cadmium compound, it has a disadvantage that it is not a desirable material in the point of pollution.

As a reference which discloses a white emitting phosphor using a mixed phosphor, the Japanese Patent Publication No. 38490/1985 can be cited.

SUMMARY OF THE INVENTION

The object of the present invention is to dissolve the above difficulties of the prior art and provide a white emitting monochrome cathode ray tube which has less luminance deterioration and burning, and has no problem of pollution.

To achieve the above object, the cathode ray tube of the present invention includes a white emitting phosphor screen the phosphor of which is composed of a mixed phosphor consisting essentially of a phosphor having the composition expressed by a composition formula $(M_{1-x}Tb_x)_2O_2S$ (wherein M is at least one element selected from the group consisting of Y and Gd, and the range of x is $0 < x \leq 0.01$) and at least one other phosphor which preferably does not contain Cd. A preferable range of x is $0 < x < 0.007$.

The phosphor of the above composition formula used for the cathode ray tube of the present invention is used as the blue emitting phosphor or the bluish white (hereinafter referred to as blue) emitting phosphor constituting a white emitting mixed phosphor, and a phosphor screen formed of the white emitting phosphor obtained by mixing the above blue emitting phosphor with at least one other phosphor is used as the phosphor screen of the cathode ray tube. The above other phosphor may be the one having such emitting color as producing a white emitting phosphor when mixed with the blue emitting phosphor of the aobve composition. However, if the above problem of pollution is considered, a phosphor containing Cd is not desirable.

Since the phosphor of the above composition formula creates a tendency of green emitting as x becomes greater, it is not desirable to make x greater than 0.01, preferably smaller than 0.007.

In the cathode ray tube of the present invention, it may be allowed to follow the prior art in regard to matters except the phosphor screen.

DESCRIPTION OF THE PREFERRED EMBODIMENTS

For better understanding of the individual embodiments, the basic concept of the present invention is further explained first.

As mentioned above, the cathode ray tube of the present invention is the one which uses a mixed phosphor of white emitting including the blue emitting phosphor of a composition formula $(M_{1-x}Tb_x)_2O_2S$ as the phosphor screen. This blue emitting phosphor is an ytrium oxysulfide phosphor activated by terbium if M is Y, and it is a gadolinium oxysulfide phosphor activated by terbium if M is Gd. In addition, a mixture of both may also be utilized.

The $(M_{1-x}Tb_x)_2O_2S$ phosphor is generally known as a phosphor having green emitting, and $Gd_2O_2S:Tb$ is registered as P43 in the above-mentioned JEDEC. The same thing can also be said for $Y_2O_2S:Tb$. Further, $Y_2O_2S:Tb$ is known as a white emitting phosphor (CIE chromaticity coordinate $x=0.269$, $y=0.311$), and it is also registered as P45 in the above-mentioned JEDEC. That is, the emitting color of this phosphor of the composition formula $(M_{1-x}Tb_x)_2O_2S$ changes in the range from green of P43 (CIE chromaticity coordinate $x=0.334$, $y=0.561$) to the above-mentioned white color of P45 according to the additive quantity of terbium, and the degree of blue strengthens as the quantity of Tb decreases. Then, the relation of additive quantity (x) of terbium to emitting color and relative brightness was examined, and the result shown in the following Table 1 was obtained.

TABLE 1

| Mark | x | Composition Formula | CIE chromaticity coordinate x | CIE chromaticity coordinate y | Relative Brightness |
|---|---|---|---|---|---|
| A | 0.04 | $(M_{0.96}Tb_{0.04})_2O_2S$ | 0.334 | 0.561 | 100 |
| B | 0.01 | $(M_{0.99}Tb_{0.01})_2O_2S$ | 0.290 | 0.425 | 80 |
| C | 0.006 | $(M_{0.994}Tb_{0.006})_2O_2S$ | 0.250 | 0.300 | 47 |
| D | 0.003 | $(M_{0.997}Tb_{0.003})_2O_2S$ | 0.240 | 0.275 | 40 |
| E | 0.001 | $(M_{0.999}Tb_{0.001})_2O_2S$ | 0.231 | 0.246 | 31 |
| F | 0.0001 | $(M_{0.9999}Tb_{0.0001})_2O_2S$ | 0.210 | 0.190 | 15 |

Figure 1:
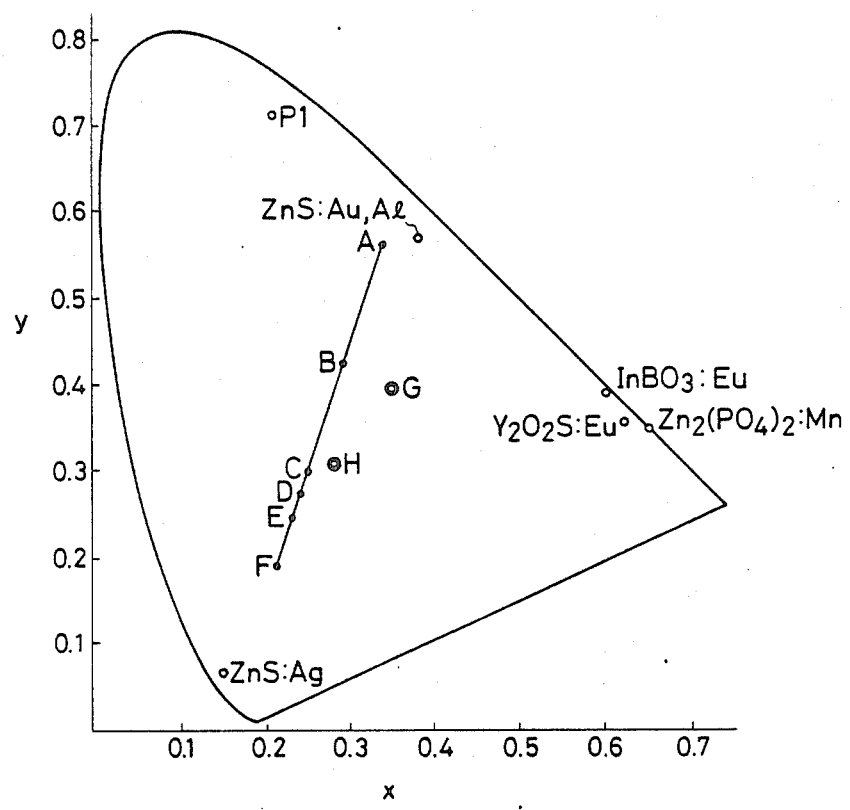
FIG. 1 is a CIE chromaticity diagram of various phosphors including the phosphors in the embodiments of the present invention.

In addition, an expression of these on the CIE chromaticity diagram is as shown in FIG. 1, From this result, it turns out that, if the additive quantity of terbium (x) is not greater than 0.01 or 1%, the emitting color changes from bluish white to blue. From such result, by using a $(M_{1-x}Tb_x)_2O_2S$ phosphor in which the additive quantity of terbium (x) is not greater than 0.01, instead of the ZnS system phosphor which has so far been used as the blue emitting phosphor of the mixture system white emitting phosphor, a monochrome cathode ray tube using the white emitting phosphor which is a mixture of the above $(M_{1-x}Tb_x)_2O_2S$ phosphor and another phosphor can be obtained.

Thus, the phosphor screen of the cathode ray tube of the present invention does not contain the blue emitting phosphor of the ZnS system, so luminance deterioration and burning are extremely little.

Incidentally, while the above conventional white emitting phosphor referred to as P45 shows bluish white, the above white emitting phosphor used in the present invention can show a white color of any tone such as yellowish white, reddish white or pure white by selecting the emitting color of the other phosphor to be mixed with the above blue emitting phosphor.

The present invention is explained below by a description of the individual embodiments.

EMBODIMENT 1

A mixed phosphor was made to grow into a screen of 20 μm–30 μm thickness by the well-known sedimentation method thereby to make a 15 inch-size cathode ray tube, which mixed phosphor comprises $(Y_{0.994}Tb_{0.006})_2O_2S$ as a blue emitting phosphor, ZnS:Au,Al as a yellow emitting phosphor and $Y_2O_2S$:Eu as a red emitting phosphor which were mixed in the weight ratio of 49:22:29, respectively. When this cathode ray tube was operated with a 18 KV anode voltage and a 50 μA cathode current to emit light, as the emitting color, a white color having a value of chromaticity of CIE chromaticity coordinate x=0.350, y=0.395 (usually referred to as paper white) as shown by a mark G in FIG. 1 was obtained. In addition, when it was continuously operated for about 30 minutes under the forced operation condition in which the raster size was set to 8×8cm² (others remaining to be same), there was obtained an excellent effect whereby burning and luminance deterioration were not noticably present in the cathode ray tube of the present invention, while they are recognizably in the conventional cathode ray tube using a blue emitting phosphor of the ZnS system.

The phosphors as marked by small circles in FIG. 1 are various other phosphors which are used for mixing.

Further, although the yellow emitting phosphor ZnS:Au,Al is a ZnS system phosphor, it caused minimal luminance deterioration and burning, in contradistinction with the blue emitting phosphor ZnS:Ag. The above phosphors ZnS:Au,Al amd $Y_2O_2S$:Eu are the same as the P22 phosphor which is registered in JEDEC.

Figure 2:
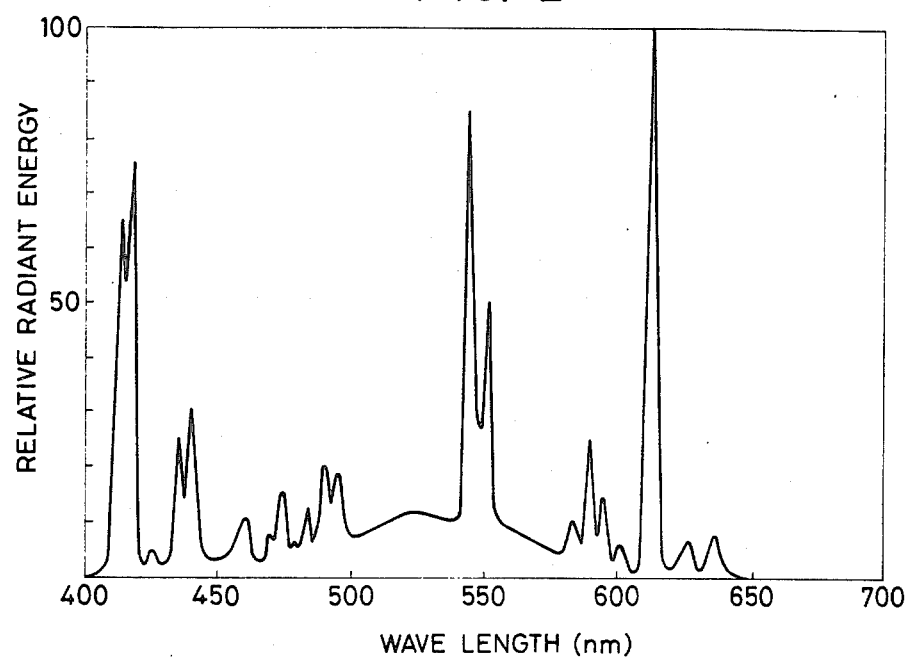
FIG. 2 is a graph showing the spectral energy distribution of the white emitting phosphor which was obtained in one embodiment of the present invention.

The spectral energy distribution of the white emitting phosphor constituting the phosphor screen of the cathode ray tube of this embodiment is shown in FIG. 2.

EMBODIMENT 2

A mixed phosphor was made to grow into a screen by the sedimentation method as in Embodiment 1 thereby to make a cathode ray tube, which mixed phosphor comprises $(Y_{0.9999}Tb_{0.0001})_2O_2S$ as a blue emitting phosphor, ZnS:Au,Al as a yellow emitting phosphor and $Y_2O_2S$:Eu as a red emitting phosphor which were mixed in the weight ratio of 79:16:5, respectively. When this cathode ray tube was made to emit light under the same condition as Embodiment 1, as the emitting color, a white color having a value of chromaticity of CIE chromaticity coordinate x=0.280, y=0.310 as shown by a mark H in FIG. 1 was obtained. In addition, also in a forced operation similar to that in Embodiment 1, burning and luminance deterioration were not seen at all.

EMBODIMENTS 3–6

The embodiments of the cathode ray tube, which were made in a manner similar to the above by using mixed phosphors of various combinations comprising the $(M_{1-x}Tb_x)_2O_2S$ phosphor mixed with other phosphors, and the effects thereof are shown in the following Table 2 together with Embodiments 1 and 2.

Figure 3:
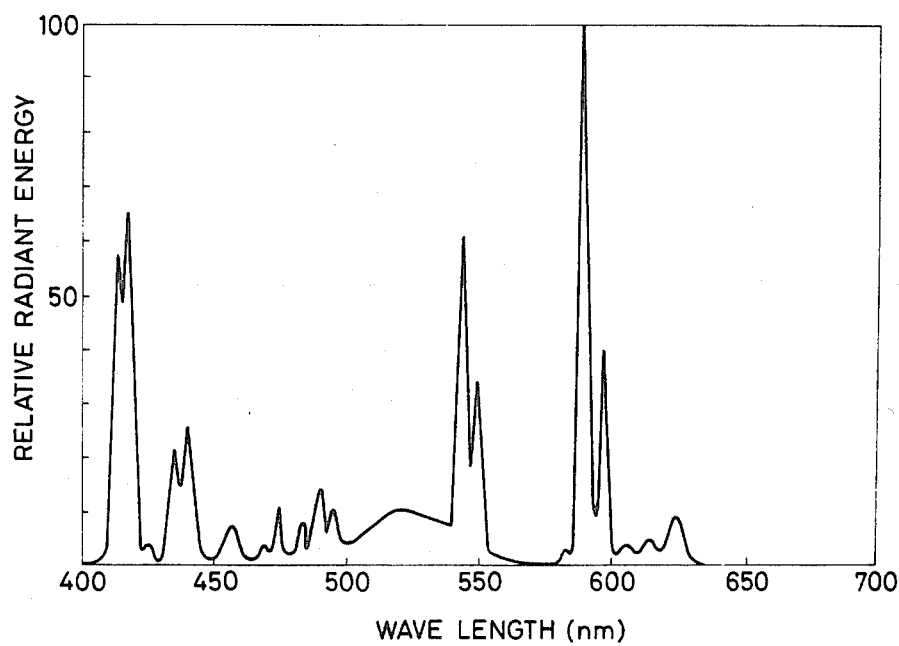
FIG. 3 is a graph showing the spectral energy distribution of the white emitting phosphor which was obtained in another embodiment of the present invention.

In addition, the spectral energy distribution of the white emitting phosphor constituting the phosphor screen of the cathode ray tube of Embodiment 3 is shown in FIG. 3.

TABLE 2

| Embodiment | Phosphors Used | | | Mixing Weight Ratio | CIE Chromaticity Coordinate | | Burning (at 18KV × 50 μA × 30 Min. |
| | Blue or Bluish White | Green or Yellow | Red | | x | y | |
| --- | --- | --- | --- | --- | --- | --- | --- |
| 1 | $(Y_{0.994}Tb_{0.006})_2O_2S$ | ZnS:AuAl | $Y_2O_2S$:Eu | 49:22:29 | 0.350 | 0.395 | Not found |
| 2 | $(Y_{0.999}Tb_{0.0001})_2O_2S$ | ZnS:AuAl | $Y_2O_2S$:Eu | 79:16:5 | 0.280 | 0.310 | Not found |
| 3 | $(Y_{0.997}Tb_{0.003})_2O_2S$ | $Zn_2SiO_4$:Mn | $InBO_3$:Eu | 36:18:46 | 0.350 | 0.395 | A little |
| 4 | $(Y_{0.999}Tb_{0.001})_2O_2S$ | $Zn_2SiO_4$:Mn | $InBO_3$:Eu | 65:11:24 | 0.280 | 0.310 | A little |
| 5 | $(Y_{0.997}Tb_{0.003})_2O_2S$ | $Zn_2SiO_4$:Mn | $Zn_3(PO_4)_2$:Mn | 35:22:43 | 0.350 | 0.395 | A litte dark |
| 6 | $(Y_{0.999}Tb_{0.001})_2O_2S$ | $Zn_2SiO_4$:Mn | $Zn_3(PO_4)_2$:Mn | 47:8:45 | 0.280 | 0.310 | A little dark |
| Comparison | ZnS:Ag | ZnS:Au,Al | $Y_2O_2S$:Eu | 17:57:26 | 0.350 | 0.395 | Very dark |

COMPARISON EXAMPLE

A cathode ray tube was made in a manner similar to Embodiment 1 except that ZnS:Ag was used as a blue emitting phosphor, and that a white emitting phosphor comprising the above blue emitting phosphor, a yellow emitting phosphor ZnS:Au,Al and a red emitting phosphor $Y_2O_2S$:Eu which were mixed in the weight ratio of 17:57:26 was used, and the characteristic thereof was examined. The result is shown in Table 2 together with the data of the above-mentioned embodiments. When ZnS:Ag is used as the blue emitting phosphor as described above, remarkable burning is generated.

In addition to the above-mentioned embodiments, for instance, when $(M_{1-x}Tb_x)_2O_2S$ was combined with other phosphors after it was added with other third additive which is supplementary additive or microadditive such as Pr and Sm, or a phosphor such as CaS:Ce phosphor, P39 phosphor, $Y_2O_2$:Eu phosphor or green emitting phosphor of the ZnS system was used as other green or yellow emitting phosphor which is the counterpart of mixing, quite the same effect as the above-mentioned was obtained.

As explained above, in the present invention, by mixing a ytrium oxysulfide phosphor activated by terbium and/or a gadolinium oxysulfide phosphor activated by terbium of a composition formula $(M_{1-x}Tb_x)_2O_2S$ with one or more other phosphors so as to form a white emitting phosphor screen, in which composition formula M is Y or Gd, and the range of x is $0 < x \leqq 0.01$, preferably $0 < x < 0.007$, the quality of the phosphor screen can be improved up to a level of no problem for practical use at which luminance deterioration and burning are less than in the conventional white emitting cathode ray tube comprising a phosphor screen which includes a blue emitting phosphor of the ZnS system. Accordingly, the cathode ray tube of the present invention has an extremely excellent effect that the operation by high input and high current density is enabled and a high resolution and high definition image as terminal display can be obtained.

Incidentally, in the cathode ray tube of the present invention, conventional knowledge and known teachings may be adopted in connection with matters not specifically described in the instant specification.

What is claimed is:

1. A cathode ray tube including a phosphor screen, wherein the phosphor being composed of a white emitting mixed phosphor consisting essentially of (i) a first phosphor having the composition expressed by a composition formula $(M_{1-x}Tb_x)_2O_2S$, wherein m corresponds to at least one element selected from the group consisting of Y and Gd and the range of x is $0 < x \leqq 0.01$ (ii) a second phosphor being selected from a group of phosphors having the compositions expressed by composition formulas ZnS:AuAl and $Zn_2SiO_4$:Mn and of phosphors having the compositions expressed by composition formulas $Y_2O_2S$:Eu, $InBO_3$:Eu and $Zn_3(PO_4)_2$:Mn and (iii) at least one other phosphor in addition to said first phosphor and said second selected phosphor included in the above group.

2. A cathode ray tube according to claim 1 wherein said other phosphor does not contain Cd.

3. A cathode ray tube according to claim 1 wherein said range of x is $0 < x < 0.007$.

4. A cathode ray tube according to claim 2 wherein said range of x is $0 < x < 0.007$.

5. A cathode ray tube according to claim 4 wherein said M is Y.

6. A cathode ray tube including a phosphor screen, wherein the phosphor being composed of a white emitting mixed phosphor consisting essentially of (i) a phosphor having the composition expressed by a composition formula $(M_{1-x}Tb_x)_2O_2S$, wherein M corresponds to at least one element selected from the group consisting of Y and Gd and the range of x is $0 < x \leqq 0.01$, (ii) a second phosphor selected from the group consisting of phosphors having the compositions expressed by composition formulas ZnS:AuAl and $Zn_2SiO_4$:Mn and (iii) a third phosphor selected from the group consisting of phosphors having the compositions expressed by composition formulas $Y_2O_2S$:Eu, $InBO_3$:Eu and $Zn_3(PO_4)$:Mn.

7. A cathode ray tube according to claim 6 wherein said range of x is $0 < x \leqq 0.007$.

8. A cathode ray tube according to claim 6 wherein said M is Y.

9. A cathode ray tube including a phosphor screen, wherein the phosphor being composed of white emitting mixed phosphor consisting essentially of a phosphor having the composition expressed by a composition formula $(M_{1-x}Tb_x)_2O_2S$, wherein M corresponds to at least one element selected from the group consisting of Y and Gd and the range of x is $0 < x \leqq 0.01$, and two additional phosphors having the compositions expressed by composition formulas $Zn_2SiO_4$:Mn and $InBO_3$:Eu.

10. A cathode ray tube according to claim 9 wherein said range of x is $0 < x \leqq 0.007$.

11. A cathode ray tube according to claim 9 wherein said M is Y.

12. A cathode ray tube according to claim 11, wherein a mixing weight ratio of phosphors represented by composition formulas $(Y_{1-x}Tb_x)_2O_2S$, $Zn_2SiO_4$:Mn and $InBO_3$:Eu ranges from 36% to 65%, from 18% to 11% and 46% to 24%, respectively.

13. A cathode ray tube including a phosphor screen, wherein the phosphor being composed of a white emitting mixed phosphor consisting essentially of a first phosphor having the composition expressed by composition formula $(M_{1-x}Tb_x)_2O_2S$, wherein M corresponds to at least one element selected from the group consisting of Y and Gd and the range of x is $0 < x \leqq 0.01$, and two additional phosphors having the compositions expressed by composition formulas ZnS:AuAl and $Y_2O_2S$:Eu.

14. A cathode ray tube according to claim 13 wherein said range of x is $0 < x \leqq 0.007$.

15. A cathode ray tube according to claim 13 wherein said M is Y.

16. A cathode ray tube according to claim 15 wherein a mixing weight ratio of phosphors represented by composition formulas $(Y_{1-x}Tb_x)_2O_2S$, ZnS:AuAl and $Y_2O_2S$:Eu ranges from 49% to 79%, 22% to 16% and 29% to 5%, respectively.

17. A cathode ray tube including a phosphor screen, wherein the phosphor being composed of a white emitting mixed phosphor consisting essentially of a phosphor having the composition expressed by composition formula $(M_{1-x}Tb_x)_2O_2S$, wherein M corresponds to an element selected from the group consising of Y and Gd and the range of x is $0 < x \leqq 0.01$, and two additional phosphors having the compositions expressed by composition formulas $ZnSiO_4$:Mn and $Zn_3(PO_4)_2$:Mn.

18. A cathode ray tube according to claim 17, wherein said range of x is $0 < x \leqq 0.007$.

19. A cathode ray tube according to claim 17, wherein said M is Y.

20. A cathode ray tube according to claim 19, wherein a mixing weight ratio of phosphors represented by composition formulas $(Y_{1-x}Tb_x)_2O_2S$, $Zn_2SiO_4$:Mn and $Zn_3(PO_4)_2$:Mn ranges from 35% to 47%, from 22% to 8% and 43% to 45%, respectively.

* * * * *